United States Patent
Fujibayashi et al.

(10) Patent No.: US 7,966,092 B2
(45) Date of Patent: Jun. 21, 2011

(54) NUMERICAL CONTROLLER WITH PROGRAM RESUMING FUNCTION

(75) Inventors: Kentaro Fujibayashi, Yamanashi (JP); Masahiko Hosokawa, Yamanashi (JP); Makoto Haga, Yamanashi (JP)

(73) Assignee: Fanuc Ltd., Minamitsuru-gun, Yamanashi (JP)

( * ) Notice: Subject to any disclaimer, the term of this patent is extended or adjusted under 35 U.S.C. 154(b) by 225 days.

(21) Appl. No.: 12/181,557

(22) Filed: Jul. 29, 2008

(65) Prior Publication Data

US 2009/0055016 A1 Feb. 26, 2009

(30) Foreign Application Priority Data

Aug. 24, 2007 (JP) ................................. 2007-218155

(51) Int. Cl.
*G06F 19/00* (2006.01)
(52) U.S. Cl. ...................................... 700/178; 700/177
(58) Field of Classification Search .............. 700/86–89, 700/159, 177, 178
See application file for complete search history.

(56) References Cited

U.S. PATENT DOCUMENTS

| 5,293,024 | A | * | 3/1994 | Sugahara et al. | ........ | 219/121.67 |
| 2004/0153199 | A1 | * | 8/2004 | Sagasaki et al. | ............... | 700/169 |
| 2006/0149411 | A1 | * | 7/2006 | Kochiya et al. | ............... | 700/160 |
| 2007/0250204 | A1 | * | 10/2007 | Ould et al. | ..................... | 700/181 |

FOREIGN PATENT DOCUMENTS

| EP | 0 568 703 | 11/1993 |
| JP | 2002-373008 | 12/2002 |

* cited by examiner

*Primary Examiner* — Ryan A Jarrett
(74) *Attorney, Agent, or Firm* — Drinker Biddle & Reath LLP

(57) ABSTRACT

A numerical controller with a program resuming function of acquiring program-resuming block data with which a machining program is resumed without producing a scratch on a workpiece. It is determined whether there are registered non-cutting commands. Whether all the registered non-cutting commands are analyzed is determined. Data of registered non-cutting command is read, and whether a block currently being analyzed includes a non-cutting command is determined. It is determined whether or not the registered non-cutting command is one in accordance with which data is acquired at a block start point. Program-resuming block data is acquired at the block start point or at a block end point, the acquired data is stored into a memory, and a process is completed.

3 Claims, 3 Drawing Sheets

NUMERICAL CONTROLLER WITH PROGRAM RESUMING FUNCTION

RELATED APPLICATION DATA

This application claims priority under 35 U.S.C. §119 and/or §365 to Japanese Application No. 2007-218155, filed Aug. 24, 2007, the entire contents of which are incorporated herein by reference.

BACKGROUND OF THE INVENTION

1. Field of the Invention

The present invention relates to a numerical controller with a program resuming function, and more particularly, to a numerical controller that acquires program-resuming block data at a non-cutting position where a workpiece is not subject to cutting.

2. Description of Related Art

In a machine tool controlled by a numerical controller, it has heretofore been practiced to arbitrarily acquire program-resuming block data of a machining program from a current state of numerical control during workpiece machining. For example, a method for acquiring program-resuming block data for every predetermined blocks at regular intervals is disclosed in JP 2002-373008A.

The above conventional method for acquiring program-resuming block data is implemented without determining states of blocks. This poses a problem that when workpiece machining is resumed using program-resuming block data, a cutting edge of a machining tool is brought in contact with an already machined workpiece portion and a scratch is formed on the workpiece.

SUMMARY OF THE INVENTION

The present invention provides a numerical controller capable of resuming a program, without producing a scratch on a workpiece, by acquiring program-resuming block data at a non-cutting position where the workpiece is never scratched when machining is resumed.

The numerical controller of the present invention acquires program-resuming block data for resuming suspended machining of a workpiece. The numerical controller comprises determining means that analyzes a machining program and determines whether or not each block of the machining program includes a non-cutting command, and data acquiring means that acquires program-resuming block data at a block which is determined to include the non-cutting command.

The non-cutting command may include at least one of: a command by a program-resuming block data acquisition code registered for acquisition of program-resuming block data; a rapid traverse command; an auxiliary function command; a command for moving a registered control axis; a feed hold stop command; a single block stop command; a tool compensation amount change command; a dwell command; a spindle stop command; a spindle rotation command; and a subprogram call command.

The numerical controller may further include means for selecting whether the program-resuming block data is to be acquired at a start point or at an end point of a block including the non-cutting command, for each non-cutting command by means of a parameter.

The numerical controller may further include means for setting not to acquire the program-resuming block data even at a block including the non-cutting command.

According to the present invention, a block can be determined, which corresponds to a non-cutting position where a workpiece is never scratched when a program is resumed, and program-resuming block data can be acquired. It is therefore possible to resume the program without producing a scratch on the workpiece.

It is also possible to properly select and set at least one non-cutting command for acquisition of program-resuming block data.

It is further possible to select, in terms of a parameter, whether program-resuming block data should be acquired at a start point or at an end point of a program block.

It is further possible to make a setting in which program-resuming block data is not acquired even at a program block including the non-cutting command.

DETAILED DESCRIPTION

Figure 1:
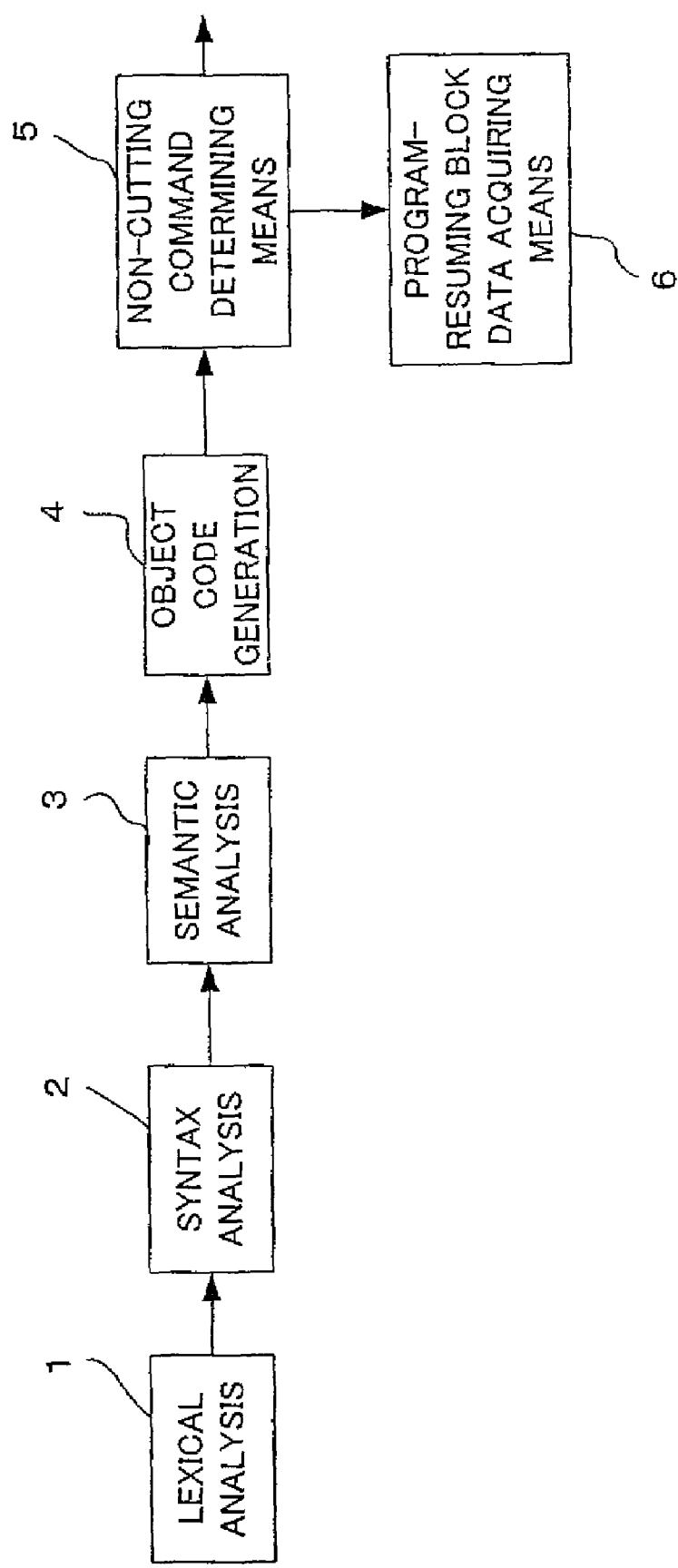
FIG. 1 is a functional block diagram showing one embodiment of the present invention in which a program analysis process to determine a non-cutting command is implemented.

FIG. 1 is a functional block diagram showing one embodiment of the present invention in which a program analysis process to determine a non-cutting feed command is implemented. A machining program is divided into alphabetic symbols and numeric symbols by a lexical analysis 1. Next, a syntax analysis 2 to determine, for example, values of G commands of the alphabetic symbols is carried out. In accordance with, for example, the values of the G commands, functions of the G commands are identified. Next, a semantic analysis 3 to implement processing for the respective functions is carried out. Subsequently, object code generation 4 to convert the result of the semantic analysis into object codes is performed. Next, one or more non-cutting commands are determined by non-cutting command determining means 5 from commands converted into the object codes. Then, whether program-resuming block data at a start point or at an end point of a non-cutting command block set by parameter setting means (not shown) should be acquired is determined by program-resuming block data acquiring means 6, and program-resuming block data is acquired.

The acquired program-resuming block data is one required for resuming the program, such as a number indicating a currently executed program block of the machining program, start and end points of the currently executed block, various pieces of modal information of the currently executed block, a parent program number, a subprogram call block position, a total number of blocks from the parent program to the currently executed block.

Next, a description will be given of exemplar non-cutting commands.

(A) Command Through a Pre-Registered Program-Resuming Block Data Acquisition Code This is an example where program-resuming block data is acquired at a block in which a program-resuming block data acquisition code for program resumption is input. The data acquisition code for program resumption is input beforehand to a program portion with which cutting is not implemented. Subsequently, the program-resuming block data is acquired when and from where the data acquisition code is executed. It is made possible to set a plurality of data acquisition codes in terms of a parameter. The following is an example where a G777 is registered as a parameter.

O0001;
N01G90G00X100.Y100.;
N02G01X200.F1000.;
N03Y200.;
N04X100.;
N05Y100.;
N06G00X0Y0;
N07G777;
N08G90G00X300.Y300.;
. . .

The meaning of each block data of program No0001 is briefly described below.

Block No01: Rapid traverse positioning through absolute command
    Block No02: Linear interpolation
    Block No03: Linear interpolation
    Block No04: Linear interpolation
    Block No05: Linear interpolation
    Block No06: Rapid traverse positioning
    Block No07: Parameter registration (G777)
    Block No08: Rapid traverse positioning through absolute command
. . .

In this case, parameter G777 is registered in block No07, and therefore, program-resuming block data is acquired at block No07.

(B) Rapid Traverse Command (End Point of Block Concerned)

At anywhere at an end point of a block including a rapid traverse command.

O0002;
N01G90G00X100.Y100.;
N02G01X200.F1000.;
N03Y200.;
N04X100.;
N05Y100.;
N06G00X0Y0;
N07G90G00X300.Y300.;
. . .

The meaning of each block data of program No0002 is described below.

Block No01: Rapid traverse positioning through absolute command
    Block No02: Linear interpolation
    Block No03: Linear interpolation
    Block No04: Linear interpolation
    Block No05: Linear interpolation
    Block No06: Rapid traverse positioning
    Block No07: Rapid traverse positioning through absolute command
. . .

In this case, since block No05 is a cutting feed block and block No06 is a rapid traverse positioning block, program-resuming block data is acquired at the end point position of block No06. Blocks No06 and No07 are an example between rapid traverse blocks. Also in this case, program-resuming block data is acquired at the end point position of block No06.

(C) Auxiliary Function Command

When an auxiliary function is executed, program-resuming block data is automatically acquired. At a program portion with which an auxiliary function is executed, cutting is not executed. Such a portion is therefore a safety position where a workpiece is never scratched even if the program is resumed. Therefore, program-resuming block data is acquired while the auxiliary function code is being executed. In addition, it is made possible to designate, in terms of a parameter, whether the data should be acquired either before or after the execution of the auxiliary function code.

O0003;
N01G90G00X100.Y100.;
N02G01X200.F1000.;
N03Y200.;
N04X100.;
N05Y100.;
N06X0Y0;
N07M101;
N08G01X300.Y300.F1000.;
N09Y400.;
. . .

The following describes the meaning of each block data of program No0003.

Block No01: Rapid traverse positioning through absolute command
    Block No02: Linear interpolation
    Block No03: Linear interpolation
    Block No04: Linear interpolation
    Block No05: Linear interpolation
    Block No06: Linear interpolation
    Block No07: Auxiliary function M101
    Block No08: Linear interpolation
    Block No09: Linear interpolation
. . .

In this case, M101 represents an auxiliary function, and therefore, program-resuming block data is acquired at block No07. As previously described, it is made possible to designate, in terms of a parameter, whether the data should be acquired at the start point of this block or after execution of the block.

(D) Command to Move a Pre-Registered Control Axis

During the operation of moving a pre-registered control axis, program-resuming block data is automatically acquired. This is effective when movement of a certain axis is used for pick feed in air cut. It is made possible to designate the control axis in terms of a parameter. It is also made possible to designate, in terms of a parameter, whether the program-resuming data should be acquired at the start point or at the end point of a block with which the designated axis is operated. The following is an example where the designated axis is a Z-axis.

Example where the Z-axis is pre-registered and data is acquired when the Z-axis operates.

O0004;
N01G90G00X0.Y0.Z-90.;
N02G01X200.F1000.;
N03Z-100.;
N04X200.;
N05X0;
N06Z-110.;
. . .

The following describes the meaning of each block data of program No0004.

Block No01: Rapid traverse positioning through absolute command
    Block No02: Linear interpolation
    Block No03: Linear interpolation
    Block No04: Linear interpolation
    Block No05: Linear interpolation
    Block No06: Linear interpolation
. . .

In this case, data is acquired at blocks No01, No03, and No06.

For acquisition of data from a block, it is made possible to set, in terms of a parameter, whether the data should be acquired at the start point or at the end point of the block.

(E) Tool Compensation Amount Change Command

In accordance with a tool compensation amount change command, program-resuming block data is automatically acquired. When a tool is replaced and a compensation amount is changed, a cutting tool is in a position where it is out of contact with a workpiece. Thus, the resuming data is acquired in such a state. It is made possible to designate, in terms of a parameter, whether the data should be acquired either before or after the tool compensation.

O0005;
N01G90G00X0.Y0.Z-90.;
N02G00X100.Y100.;
N03M03T001;
N04G43H01;
N05G01X200.F1000.;
N06Y200;
N07X100.;
N08Y100.;
N09G00X0Y0;
. . .

The following briefly describes the meaning of each block data of program No0005.

Block No01: Rapid traverse positioning through absolute command
Block No02: Linear interpolation
Block No03: Main spindle clockwise rotation
Block No04: Tool length compensation+
Block No05: Linear interpolation
Block No06: Linear interpolation
Block No07: Linear interpolation
Block No08: Linear interpolation
Block No09: Rapid traverse positioning
. . .

In this case, data is acquired at a block that includes G43, which is a tool length compensation change command in block No04. As previously described, it is made possible to set, in terms of a parameter, whether the data should be acquired either before or after the compensation.

(F) Dwell Command

Program-resuming block data is acquired when a dwell command is executed.

O0006;
N01G90G00X0.Y0.Z-90.;
N02G04X5.;
N03G00X100.Y100.;
N04G01X200.F1000.;
N05Y200;
N06X100.;
N07Y100.;
N08G00X0Y0;
. . .

The following briefly describes the meaning of each block data of program No0006.

Block No01: Rapid traverse positioning through absolute command
Block No02: Dwell
Block No03: Rapid traverse positioning
Block No04: Linear interpolation
Block No05: Linear interpolation
Block No06: Linear interpolation
Block No07: Linear interpolation
Block No08: Rapid traverse positioning
. . .

In this case, a dwell command is included in block No02 with which the program is suspended for 5 seconds. Data is acquired at this block.

(G) Spindle Stop Command or Spindle Rotation Command (at Start Point of a Block Concerned)

When the spindle is stopped, cutting is not implemented. Thus, program-resuming block data is acquired at a block with which the spindle is stopped. Also at the start point of a block including a spindle rotation command, cutting is not implemented, and therefore program-resuming block data is acquired.

(H) Subprogram Call Command

Program-resuming block data is acquired at a block in which a subprogram is called.

O0007;
N01G90G00X0.Y0.Z-90.;
N03G00X100.Y100.;
N04G01X200.F1000.;
N05Y200;
N06X100.;
N07Y100.;
N08G00X0Y0;
N09M98P0077;
. . .

The following briefly describes the meaning of each block data in program No0007.

Block No01: Rapid traverse positioning through absolute command
Block No02: Rapid traverse positioning
Block No03: Linear interpolation
Block No04: Linear interpolation
Block No05: Linear interpolation
Block No06: Linear interpolation
Block No07: Linear interpolation
Block No08: Rapid traverse positioning
Block No09: Subprogram call
. . .

In this case, a subprogram of 077 is called in block No09. In this example, a call from a main program is executed in accordance with M98. A subprogram number is indicated by P. An address character "O" is used as subprogram number.

When the subprogram is called, cutting is not being implemented, and therefore data is acquired.

Next, a description is given of means for registering the above described non-cutting commands.

Figure 3:
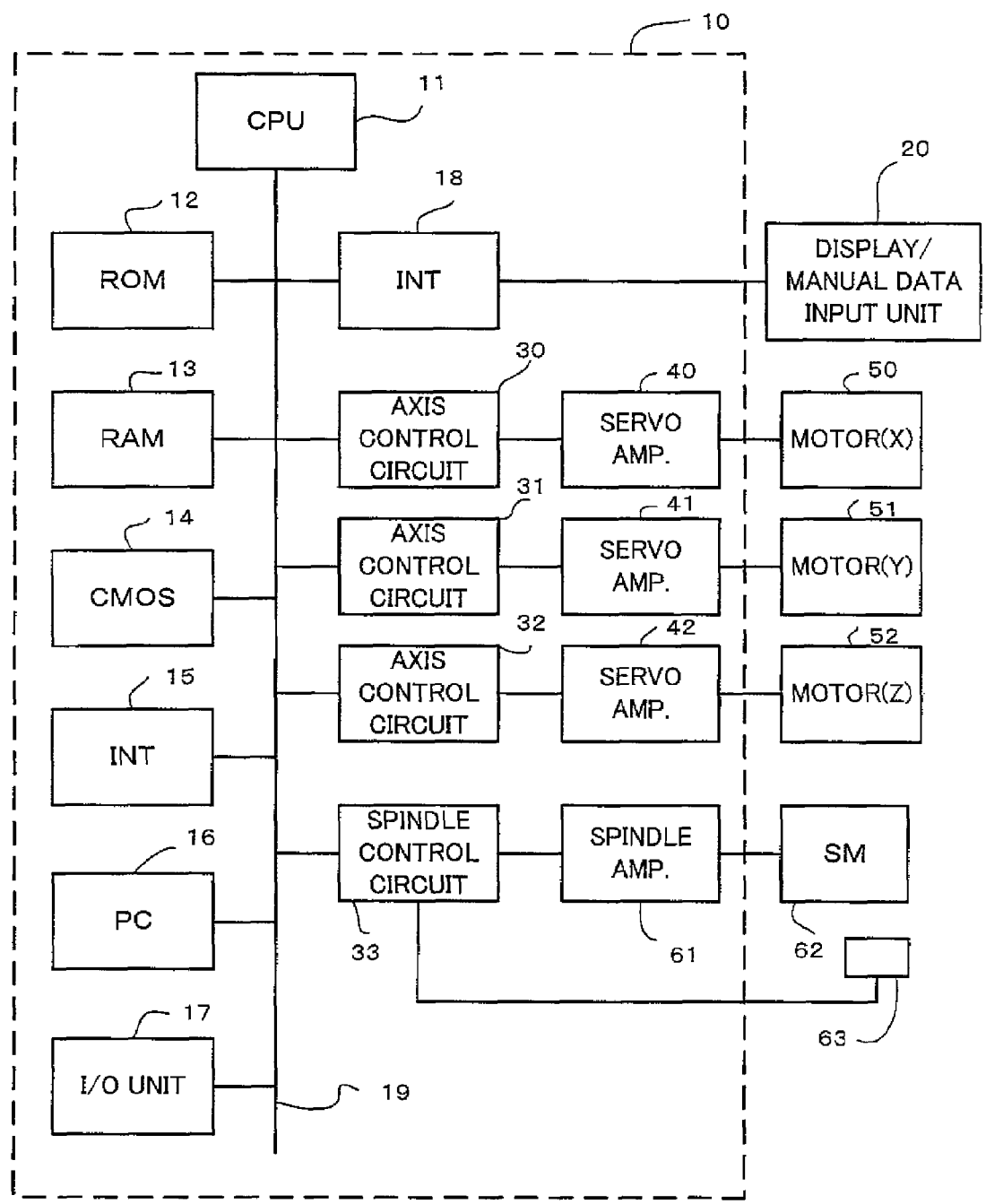
FIG. 3 is a block diagram showing an essential part of a numerical controller according to the one embodiment of the present invention.

For registration of the non-cutting commands, non-cutting command determination codes in Table 1 are stored beforehand, as a non-cutting command determination code table, into a storage unit such as, for example, a CMOS memory 14 of a numerical controller 10 shown in FIG. 3. For acquisition of program-resuming block data, the non-cutting command determination codes shown in FIG. 1 and stored in the determination code table are programmed into a program for operating the numerical controller.

It is possible to always operate the programmed non-cutting command determination codes. Alternatively, by setting parameters by parameter setting means, it is possible to decide whether or not program-resuming block data should be acquired in accordance with the non-cutting commands in Table 1. It is further possible, by setting parameters, to decide whether the data should be acquired at the start point or at the end point of each block including one of the non-cutting commands.

TABLE 1

DETERMINATION CODE TABLE OF NON-CUTTING COMMAND

| (*2) | Non-cutting command | Acquisition: 0, Non-acquisition: 1 | Acquisition at start point: 0, Acquisition at end point: 1, Irrelevance: — |
|---|---|---|---|
| (1) | Program-resuming block data acquisition code pre-registered as non-cutting command for program-resuming block data acquisition | 0 | 0 |
| (2) | End point of block including rapid traverse command | 0 | 0 |
| (3) | Auxiliary function command | 0 | 1 |
| (4) | Command for moving pre-registered control axis | 1 (*1) | 0 |
| (5) | Feed hold stop command | 0 | — |
| (6) | Single block stop command | 0 | — |
| (7) | Tool compensation amount change command | 0 | 0 |
| (8) | Dwell command | 0 | 0 |
| (9) | Spindle stop command | 0 | 0 |
| (10) | Start point of block including spindle rotation command | 0 | — |
| (11) | Subprogram call command | 0 | — |

(*1) Depending on machining programs, in some cases, program-resuming block data should not be acquired in accordance with even a command for moving a pre-registered control axis and for acquisition of program-resuming block data. For example, in certain machining, a command for moving a pre-registered control axis is defined to function as a non-cutting command when the pre-registered control axis operates. However, it is not ensured in all of programs that such a command functions as a non-cutting command. Therefore, depending on machining programs, a setting should be such that program-resuming block data is not acquired.
(*2) Symbols (1) to (11) are mere numbers, and these numbers themselves and the listed order thereof have no significance.

A program example (O0008) is shown below.

In accordance with the following program example, zigzag machining is performed on a surface along an X-Z plane over a workpiece length of 30 mm in the X-axis direction. The program is programmed such that a tool is operated at a location 5 mm away from the workpiece when the Y-axis operates.

In this case, commands for the Y-axis are each registered as a "command for moving a predetermined control axis." Thus, program-resuming block data is acquired at blocks No06, No11, No16, and No21. If in this manner it is understood from the content of the machining program that there is a command that functions as a non-cutting command when a certain axis operates, it is made possible to make a setting of ON for the "command for moving a pre-registered control axis." However, such cannot be ensured in all of programs, and therefore, a setting of OFF is required.

O0008;
N01G91G01F1000.;
N02X10.;
N03X10.Z10.;
N04X10.Z-10.;
N05X10.;
N06Y2.;
N07X-10.;
N08X-10.Z10.;
N09X-10.Z-10.;
N10X-10.;
N11Y2.
N12X10.;
N13X10.Z10.;
N14X10.Z-10.;
N15X10.;
N16Y2.
N17X-10.;
N18X-10.Z10.;
N19X-10.Z-10.
N20X-10.;
N21Y2.
. . .
M30;

The following describes the meaning of each block data of program No0008.

Block No01: Linear interpolation in accordance with incremental command
Block No02: Linear interpolation
Block No03: Linear interpolation
Block No04: Linear interpolation
Block No05: Linear interpolation
Block No06: Linear interpolation
Block No07: Linear interpolation
Block No08: Linear interpolation
Block No09: Linear interpolation
Block No10: Linear interpolation
Block No11: Linear interpolation
Block No12: Linear interpolation
Block No13: Linear interpolation
Block No14: Linear interpolation
Block No15: Linear interpolation
Block No16: Linear interpolation
Block No17: Linear interpolation
Block No18: Linear interpolation
Block No19: Linear interpolation
Block No20: Linear interpolation
Block No21: Linear interpolation
. . .
End of program Program-resuming block data acquisition codes each of which is command 1 shown in Table 1 and is pre-registered as a non-cutting command for acquisition of program-resuming block data are registered by parameter setting means using command codes and command data as shown in Table 2.

TABLE 2

Program-resuming block data acquisition code

| No. | Setting item | Setting data |
|---|---|---|
| 1 | Command code | M |
|   | Command data | 100 |
| 2 | Command code | G |
|   | Command data | 900 |

Figure 2:
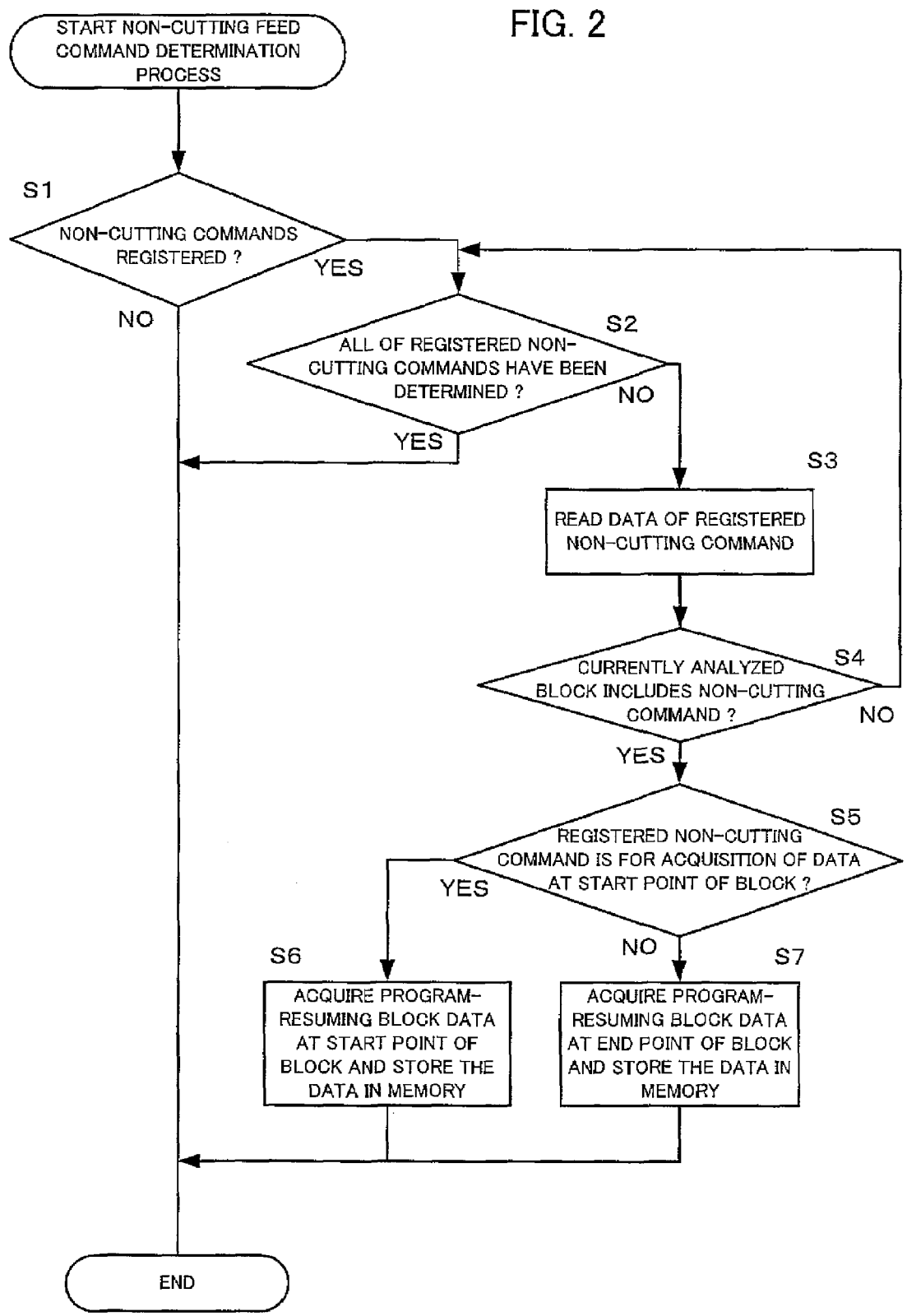
FIG. 2 is a flowchart showing the algorithm of a non-cutting feed command determination process.

Next, a description will be given of a flowchart showing the algorithm of a non-cutting feed command determination process, which is shown in FIG. 2 and implemented by the non-cutting command determining means 5 in FIG. 1.

At start of the non-cutting feed command determination process, it is determined whether or not one or more non-cutting commands are registered (Step S1). If No to Step S1, the determination process is completed. If YES to Step S1, it is determined whether or not all of the registered non-cutting commands have been determined (Step S2). If YES to Step S2, i.e., if it is determined that all the registered non-cutting commands have been determined, the process is completed. If No to Step 2, data of a registered non-cutting command is read (Step S3), and the process proceeds to Step S4. Then it is determined whether or not the non-cutting command is included in a block currently analyzed (Step S4). If No to Step S4, the process returns to Step S2. If YES to Step S4, the process proceeds to Step S5 to determine whether or not the registered non-cutting command is a command for data acquisition at the start point of the block (Step S5). If YES to Step S5, program-resuming block data is acquired at the start point of the block and the acquired data is stored in the memory (Step S6), and then the process is completed. If NO to Step S5, program-resuming block data is acquired at the end point of the block and the acquired data is stored in the memory (Step S7), and then the process is completed. It should be noted that for the non-cutting command indicated in Table 1 as being irrelevant to the start point and to the end point, the process proceeds to Step S7 in which program-resuming block data is acquired at the end point of the block and stored into the memory.

FIG. 3 is a block diagram of an essential part of a numerical controller 10 according to one embodiment of the present invention. A CPU 11 is a processor for overall control of the numerical controller 10. The CPU 11 reads out a system program stored in a ROM 12 via a bus 19 and controls the entire numerical controller in accordance with the system program. A RAM 13 stores temporary calculation data, display data, and various data input by an operator via a display/manual data input (MDI) unit 20 including a display comprised of a CRT, a liquid crystal display or the like and manual data input means comprised of a keyboard or the like. A CMOS memory 14 is configured as a nonvolatile memory, which is backed up by a battery, not shown, and adapted to hold stored contents even when the power supply to the numerical controller 10 is turned off.

The CMOS memory 14 stores a machining program read therein via an interface 15, a machining program read therein via the display/MDI unit 20 and an interface 18. A program for acquisition of program-resuming block data according to the embodiment of the present invention is stored beforehand into the ROM 12.

The interface 15 is able to connect the numerical controller 10 and external equipment. In accordance with a sequence program stored in the numerical controller 10, a PC (programmable controller) 16 outputs, via an I/O unit 17, signals to an auxiliary unit (for example, an actuator such as a robot hand for tool replacement) of a machine tool which is a controlled object, and controls the auxiliary unit. The PC 16 receives signals, for example, from various switches of an operation panel installed on a main unit of the machine tool, which is a controlled object of the numerical controller 10, performs required signal processing on the signals, and transfers the processed signals to the CPU 11.

Axis control circuits 30 to 32 for respective feed axes receive amounts of motion command for the feed axes from the CPU 11, and output commands for the feed axes to servo amplifiers 40 to 42. The servo amplifiers 40 to 42 receive respective ones of the commands and drive servomotors 50 to 52 for the feed axes of the machine (controlled object). Each of the servomotors 50 to 52 for the feed axes incorporates a position/velocity detector for use in position/velocity feedback control. In FIG. 3, illustration of position/velocity feedback is omitted.

A spindle control circuit 33 receives a spindle rotation command and outputs a spindle velocity signal to a spindle amplifier 61. The spindle amplifier 61 receives the spindle velocity signal, and rotates a spindle motor 62 at a commanded rotation speed to thereby drive a main spindle. In synchronism with the rotation of the spindle motor 62, a position coder 63 feeds a feedback pulse back to the spindle control circuit 33 for velocity control.

The above described hardware configuration of the numerical controller 10 is substantially the same as that of the conventional numerical controller, but is different therefrom in that the program for implementing the non-cutting feed command determination process is stored in the ROM 12, and the non-cutting command determination code table shown in Table 1 is stored in a storage unit, such as the CMOS memory 14, that constitutes the numerical controller. For the non-cutting commands in the non-cutting command determination code table shown in Table 1, the parameter is set to a value of 0 for a case where program-resuming block data should be acquired and to a value of 1 for a case where such data should not be acquired. It is therefore possible to cause one or more of the non-cutting command determination codes to always operate and others not to operate. It is further possible to select at which portion of a block the program-resuming block data should be acquired, by setting the parameter to "0" for a case where the data should be acquired at the start point of the block, to "1" for a case where the data should be acquired at the end point of the block, and to "-" for a case where the data acquisition is irrelevant to the start and end points of the block.

What is claimed is:

1. A numerical controller with a program resuming function, which analyzes and executes blocks of a machining program to control a machine tool and execute machining of a workpiece, wherein said controller acquires, during execution of the machining program, two or more program-resuming block data for resuming suspended machining of the workpiece and resumes machining of the workpiece based on the acquired program-resuming block data, said numerical controller comprising registering means for registering at least one non-cutting command;

non-cutting command determining means for determining whether or not each block of the machining program is a block of the non-cutting command registered in said registering means;

means for acquiring the program-resuming block data when determined, by said non-cutting command determining means, to be a block of the non-cutting command;

means for selecting whether the program-resuming block data is to be acquired by said program-resuming block data acquiring means at a start point or at an end point of the block, by means of a parameter for each non-cutting command.

2. A numerical controller according to claim 1, wherein the non-cutting command includes at least one of: a command by a program-resuming block data acquisition code registered for acquisition of program-resuming block data; a rapid traverse command; an auxiliary function command; a command for moving a registered control axis; a feed hold stop command; a single block stop command; a tool compensation amount change command; a dwell command; a spindle stop command; a spindle rotation command; and a subprogram call command.

3. A numerical controller according to claim 1, further comprising means for setting not to acquire the program-resuming block data even at a block including the non-cutting command.

* * * * *